Oct. 1, 1963     W. T. HEDLUND     3,105,644

FOOD WASTE DISPOSER

Filed Jan. 27, 1961     2 Sheets-Sheet 1

INVENTOR.
WALTER T. HEDLUND
BY C. R. Stratton
ATTORNEY

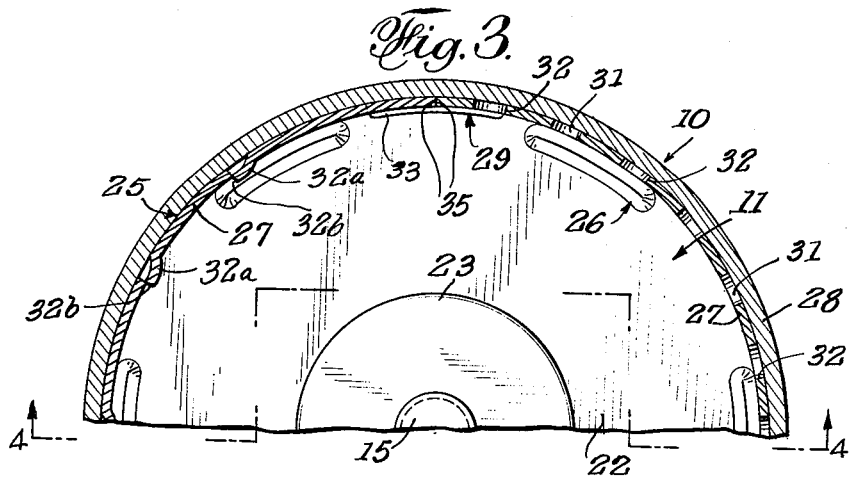
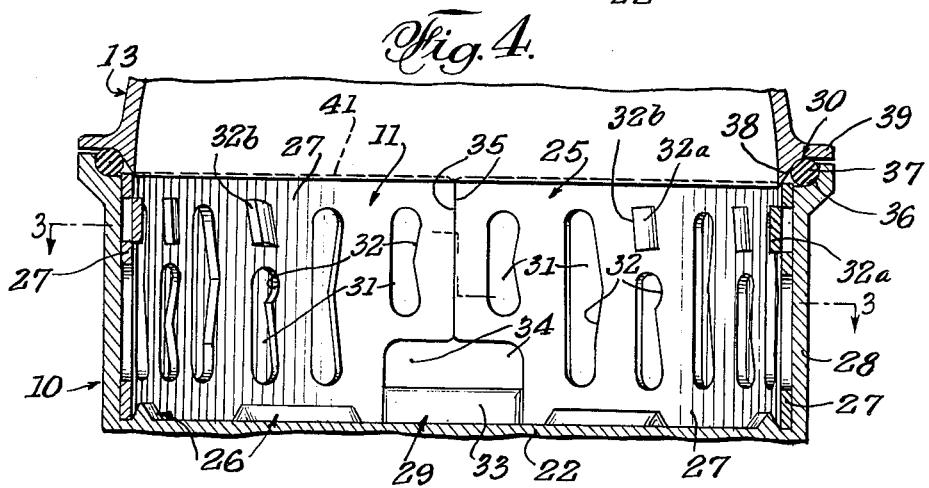
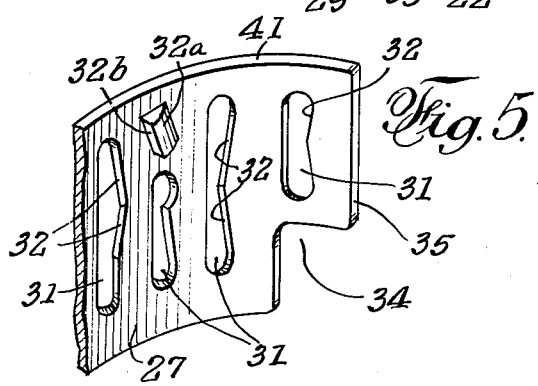

United States Patent Office 3,105,644
Patented Oct. 1, 1963

3,105,644
FOOD WASTE DISPOSER
Walter T. Hedlund, Beverly Hills, Calif., assignor to W. T. Hedlund Company, Los Angeles, Calif., a corporation of California
Filed Jan. 27, 1961, Ser. No. 85,372
6 Claims. (Cl. 241—275)

This invention relates to food waste disposers and has for an object to provide novel and improved means for efficiently comminuting waste material so the same readily washes down a drain.

Another object of the invention is to provide a waste disposer of low cost construction because of its ease of assembly, and of low cost maintenance primarily due to replaceability of the parts that grind the waste material.

A further object of the invention is to provide an improved waste-disposing structure that embodies a simple assemblage of grinder parts, securement, in operative position of said parts, being effected by and upon assembly of the waste-receiving hopper onto the waste-comminuting housing of the disposer.

A still further object of the invention is to provide a food waste disposer of the character referred to in which novel deflecting and grinding means is provided on the replaceable comminuting elements, such that the direction of the centrifugal movement of the waste, under force imposed by a rotor, is varied to improve the comminuting efficiency of the disposer.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 3 is an enlarged fragmentary cross-sectional view as taken on the line 3—3 of FIG. 4.

FIG. 4 is a fragmentary vertical sectional view as taken on the line 4—4 of FIG. 3.

FIG. 5 is a perspective view of a fragment of a comminuting element used in the disposer.

Figure 1:
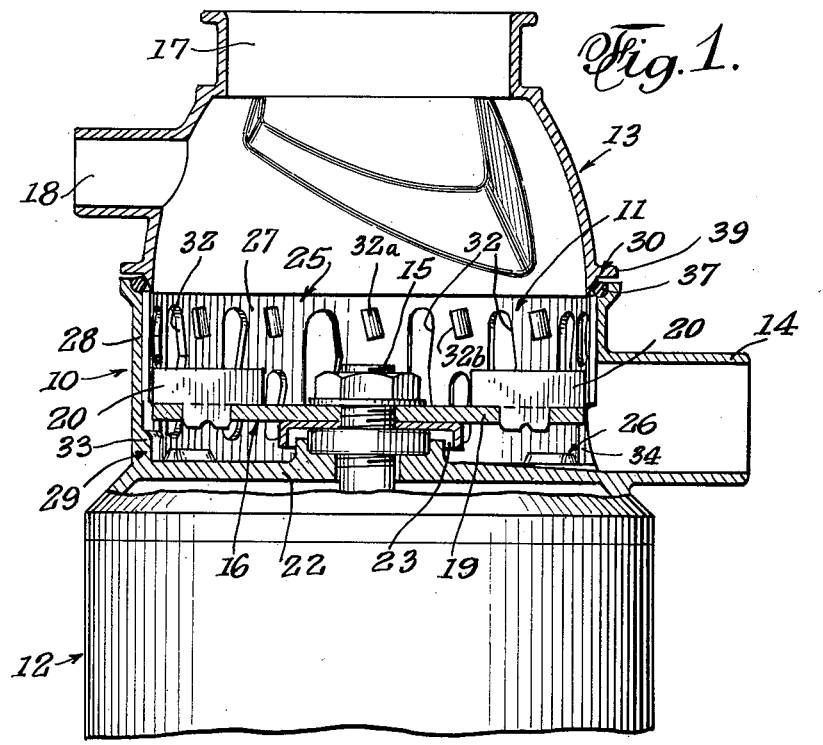
FIG. 1 is a vertical sectional view of a food waste disposer according to the present invention, with the prime mover thereof partly broken away.
Figure 2:
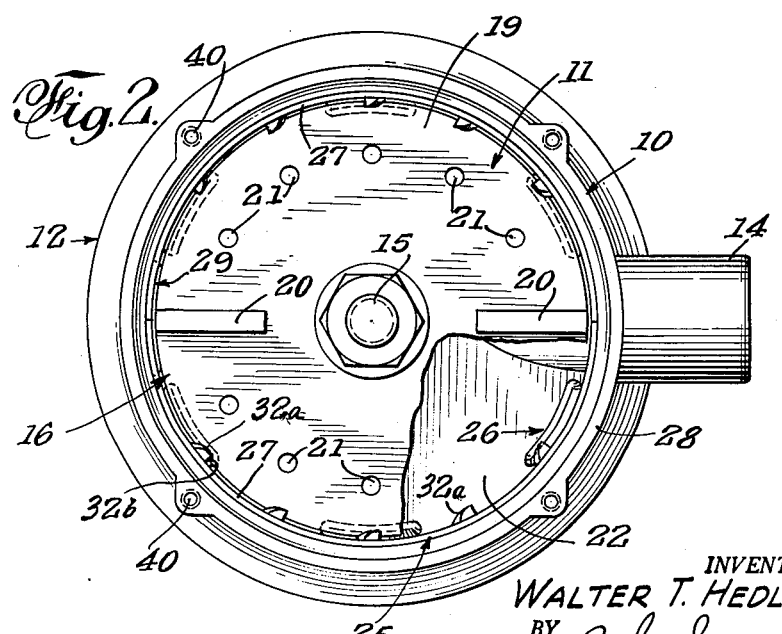
FIG. 2 is a plan view thereof with the waste-receiving hopper removed, with a portion of the hopper broken away.

The present invention is based upon a generally conventional waste disposer that comprises a cylindrically tubular housing 10, the interior of which constitutes a comminuting or grinding chamber 11, a prime mover, usually an electric motor 12, that operates the disposer; and a hopper or other upper enclosure 13 that receives waste from above and directs the same into the chamber 11.

It is common for the housing 10 to be provided with a lateral or other suitably directed outlet 14 that passes waterborne material from the chamber 11 to a drain. Also, quite usually, the motor 12 has its driven shaft 15 on an axis extending into said chamber to carry and drive a rotor 16 at suitably high speed so that waste material entering chamber 11 is centrifugally thrown against the wall of said chamber. It is also common for the hopper 13 to have an upper inlet opening 17 for admitting waste material. The provision of a vent outlet 18 in said hopper, also, is common.

The rotor 16 is shown as a circular plate 19 that is provided with material-slinging lugs 20 in diametrically arranged, balanced position, and a plurality of material-draining apertures 21 in the plate so that water-borne comminuted material may pass therethrough to the bottom 22 of housing 10 and thence outward through drain outlet 14.

A bearing and grease seal arrangement 23 may be provided to seal around the shaft 15 to obviate entry of the contents of chamber 11 into the housing or interior of the motor 12.

As based on the above generally described conventional disposer, the improvements of the present invention comprise, generally a two-piece removable waste-grinding sleeve 25 lining the inner face of the housing 10, a set of embossments 26 extending upwardly from the face of bottom 22 to locate the sleeve halves or pieces against the tubular housing wall 28, means 29 to key the sleeve 25 against rotative movement, and means 30 constituting a combined seal between the housing 10 and the hopper's sleeve-engaging wedge.

The sleeve 25 is preferably formed of similar halves 27 of hard, long-wearing sheet material to have a slip fit into chamber 11 and to line the wall 28 of said chamber for the full height of said wall. Each said sleeve half is provided with a plurality of generally vertically disposed openings 31 and, for operative relationship with rotor 16, the edges 32 against which material is centrifugally slung by the lugs 20 of the rotor, are preferably variously sloped or angled, as can be clearly seen from FIGS. 4 and 5. Ordinarily, the centrifugally directed waste material would tend to follow an undeviating circular path, except as interrupted by said edge 32. The slope of said edges 32 in different directions causes deviation, upwardly and downwardly at varying angles, of the waste material while in the process of being comminuted, thus materially improving comminution. For rotors that are driven clockwise, said grinding edges 32 are on the side of the openings 31 as shown; for counter-clockwise rotors, these edges would be on the opposite side of the openings. It will be noted from FIG. 1 that the major portions of edges 32 are located above the level of the rotor plate 19 so that said plate and the lugs 20 thereon may throw material centrifugally to become comminuted.

In addition to the grinding edges 32, the sleeve halves 27, near their upper edges, may be provided with a plurality of inwardly directed lugs 32a that are here shown as sheared from the material of the halves and inwardly displaced to provide abutments 32b facing as do the edges 32. Said lugs 32a act on waste material inwardly of the material that engages edges 32, to break and comminute the same. These lugs are shown at an incline to the vertical in such a direction that material encountering the same is biased downwarly toward the rotor, thus reducing any tendency of material to spray upwardly in the hopper.

The set of embossments 26 is arranged to be concentric with the curvature of wall 28 and so spaced therefrom that the sleeve halves will slidingly fit into the annular space thus provided, as clearly shown in FIG. 4. The tapered form of the embossments allows for easy sliding fit of the parts.

The key means 29 is shown as a key enlargement 33, formed as a thickened portion of the wall 28, preferably opposite to the outlet 14 and as recesses 34 at both ends of each sleeve half 27, the recess, when the end edges 35 of the sleeve halves are in abutted relation, as in FIG. 4, combining to define a key slot into which the key enlargement 33 fits. Hence, the sleeve 25 is held against rotative movement in the housing 10, yet the same can be easily slid out of the housing in an upward direction. The recesses 34 at the opposite ends of the sleeve halves cooperate to form a discharge opening in the sleeve that is preferably in register with the outlet 14.

The means 30 is shown as an annular seat 36 in the upper annular edge of the housing wall 28, said seat opening both upwardly and inwardly, a resilient, preferably round-sectioned sealing ring 37 disposed in said seat and of such cross-sectional size or thickness that the same extends upwardly above said wall edge and inwardly of the inner face of said wall 28, and an inverted conical annular extension 38 on the lower edge of the hopper 13 that, by reason of its conical outer face, wedges against and compresses said sealing ring against its seat, and an annular flange 39 on said hopper immediately above and outward of said conical extension that overstands the ring. It will be clear that by passing bolts through enlargements of flange 39 into screw seats 40 in the upper edge of wall 28, and tightening up thereon, the hopper 13 and housing 10 are securely connected with an effective non-leakage seal there-between.

By terminating the upper edges 41 at or slightly above the seat 36, when sleeve halves 27 are in place, the extension 38 of the hopper will overstand said edges so the conical outer face of said extension will wedge the sleeve halves tightly against the housing wall 28. Also, the upper end of the sleeve will cooperate with the seat 36 to effectively wedge or confine the sealing ring.

Efficient operation depends only on an adequate flow of water so the same may readily carry the comminuted particles through orifices 21 of the rotor, around the perimeter of the rotor, and outwardly through the outlet 14.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. In a waste disposer having a comminuting chamber enclosed within a housing with an outlet from said chamber and a rotor to centrifugally sling waste entering said chamber from above, the improvement that comprises a hard two-part metal sleeve lining said housing and provided with a plurality of edges to comminute waste centrifugally slung against the inner surface of said sleeve, embossment means disposed on the bottom surface of said chamber and inwardly concentric with the inner surface of the housing and affording an annular space into which the two-part sleeve is independently removably fitted, the sleeve being inward of the inner housing surface and outward of the embossment means, and key means adjacent said bottom surface and engaging both parts of the sleeve and non-rotatively keying said sleeve to the housing.

2. In a waste disposer having a comminuting chamber enclosed within a housing with an outlet from said chamber, a rotor to centrifugally sling waste entering said chamber from above, and a hopper over said chamber, the improvement that comprises a hard two-part metal sleeve having a top edge and a bottom edge lining said housing and provided with a plurality of edges to comminute waste centrifugally slung against the inner surface of said sleeve, a seal between the housing and hopper and including a conical extension of the hopper, one of said top and bottom edges of the sleeve being bottomed on the housing, and the other edge being engaged between said conical extension and the inner face of the housing.

3. A waste-comminuting sleeve for the grinding chamber of a waste disposer having keying formations, said sleeve comprising similar halves each being provided with a plurality of openings, each opening having waste-comminuting edges said sleeve halves having confronting recesses forming divided slots for cooperation with keying formations in said chamber.

4. A waste disposer having a comminuting chamber enclosed within a housing member having a tubular wall, said wall being provided with opposed keying formations, a tubular hopper disposed over said housing member with the outer portion of the bottom edge thereof seated on a sealing gasket disposed between said housing member and said hopper, separable means connecting said hopper and said member, a multi-part waste-comminuting sleeve co-axially disposed in said chamber and having confronting recesses on adjacent parts thereof seating on said formations, and wherein the inner portion of said hopper edge bears against said sleeve whereby upon partial separation of said means different parts of said sleeve may be removed to be replaced by a similar part.

5. A waste disposer according to claim 4 wherein said tubular wall is provided with an annular bottom member having embossment means inwardly concentric of said wall removably receiving the bottom of said sleeve.

6. A waste disposer according to claim 4 wherein parts of said sleeve are provided with irregularly spaced apertures having irregularly shaped comminuting edges.

References Cited in the file of this patent
UNITED STATES PATENTS

| | | |
|---|---|---|
| 2,322,058 | Powers | June 15, 1943 |
| 2,357,843 | Morrissey | Sept. 12, 1944 |
| 2,646,985 | Backlund et al. | Oct. 27, 1953 |
| 2,730,308 | Jordan | Jan. 10, 1956 |
| 2,991,949 | Sellars | July 11, 1961 |
| 3,014,671 | Thompson | Dec. 26, 1961 |
| 3,026,050 | Bebinger | Mar. 20, 1962 |